United States Patent [19]

Tazaki et al.

[11] Patent Number: 5,391,671
[45] Date of Patent: Feb. 21, 1995

[54] STYRENE COPOLYMER AND PROCESS FOR PRODUCTION THEREOF

[75] Inventors: Toshinori Tazaki; Masahiko Kuramoto, both of Ichihara, Japan

[73] Assignee: Idemitsu Kosan Co., Ltd., Tokyo, Japan

[21] Appl. No.: 88,523

[22] Filed: Jul. 9, 1993

Related U.S. Application Data

[62] Division of Ser. No. 598,637, Oct. 19, 1990, Pat. No. 5,262,504.

[30] Foreign Application Priority Data

Mar. 31, 1989 [JP] Japan .................................. 1-78167
Mar. 31, 1989 [JP] Japan .................................. 1-78168
Mar. 31, 1989 [JP] Japan .................................. 1-78169

[51] Int. Cl.$^6$ .................. C08F 212/10; C08F 212/14
[52] U.S. Cl. ............................ 526/347; 526/160; 526/165; 526/262; 526/293; 526/342
[58] Field of Search .......... 526/160, 165, 347, 262, 526/293, 342

[56] References Cited

U.S. PATENT DOCUMENTS 4,978,730 12/1990 Maezawa et al. ............... 526/160 X
5,317,069 5/1994 Chiang et al. ...................... 526/262

FOREIGN PATENT DOCUMENTS 0271875 6/1988 European Pat. Off. ............. 526/165
0468988 3/1971 Japan .

*Primary Examiner*—Fred Teskin
*Attorney, Agent, or Firm*—Oblon, Spivak, McClelland, Maier, & Neustadt

[57] ABSTRACT

A styrene copolymer which comprises a styrene repeating unit (a) represented by the general formula (I):

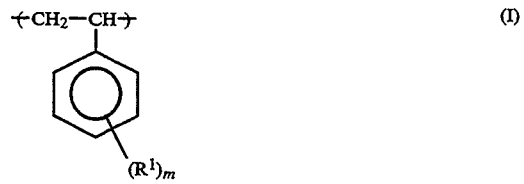

and an acrylonitrile repeating unit (b) represented by the general formula (II-(b)):

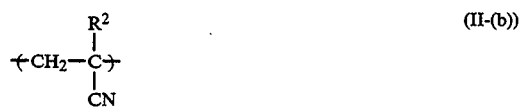

unsaturated carboxylic acid or its ester repeating unit (c) represented by the general formula (II-(c)):

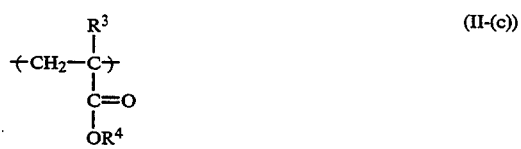

or maleimide or N-substituted maleimide (d) represented by the general formula (II-(d)):

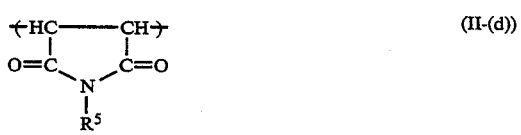

(in the formula, symbols are the same as defined in the specification)

wherein stereoregularity of the styrene repeating unit (a) chain is a high degree of syndiotactic configuration is disclosed.

6 Claims, No Drawings

STYRENE COPOLYMER AND PROCESS FOR PRODUCTION THEREOF

This application is a divisional application Ser. No. 07/598,637, filed Oct. 19, 1990, now U.S. Pat. No. 5,262,504, which was filed as International Application No. PCT/JP90/00371, on Mar. 20, 1990.

FIELD OF THE INVENTION

The present invention relates to a styrene copolymer and a process for production thereof, more specifically it relates to a copolymer which comprises a styrene monomer and (1) an acrylonitrile monomer, (2) an unsaturated carboxylic acid or its ester monomer, or (3) a maleimide or N-substituted maleimide monomer, having a specific stereostructure, and to an efficient process for production thereof.

BACKGROUND OF THE INVENTION

A styrene polymer produced by the radical polymerization method, etc. has an atactic configuration in stereostructure. It is molded into various shapes by various molding methods such as injection molding, extrusion molding, blow molding, vacuum molding and cast molding, for example, and has been widely used for electric domestic appliances, office equipments, domestic appliances, packaging containers, toys, furniture, synthetic papers and other industrial materials.

However, the styrene polymer having an atactic configuration has drawbacks that it is inferior in heat resistance and chemical resistance.

The group of the present inventors have succeeded to develop a styrene polymer having a high degree of syndiotacticity, and also developed a styrene copolymer in which other components are blended with the styrene monomer (Japanese Patent Application Laid-Open Nos. 104818/1987 and 241009/1988). Such polymer or copolymer having a syndiotactic configuration has excellent heat resistance, chemical resistance and electric characteristic, and expected to be applied in various fields.

However, the above polymer, particularly, syndiotactic polystyrene is a polymer wherein glass transition temperature is 90° to 100° C. and melting point is 250° to 275° C. Heat deformation temperature under light load is high level, i.e. around melting point, while heat deformation temperature under heavy load is around glass transition temperature, that is, it is almost the same as that of general-purpose polystyrene (GPPS).

For improvement of the properties of styrene polymer having syndiotactic configuration, we proposed to compound it with other thermoplastic resin, inorganic filler and the like. But there are still some room for improvement in adhesion of the interface and compatibility.

Accordingly, the present inventors have studied intensively to develop a copolymer whose impact resistance is improved while maintaining heat resistance and chemical resistance of a polystyrene having a syndiotactic configuration, or a copolymer whose heat resistance is further improved by raising glass transition temperature (heat deforemation temperature under heavy load) or heat decomposition temperature, which has good compatibility and adhesion to other resin or inorganic filler and improved wettability, and further to develop an efficient process for production of said copolymer.

As the results, we have found that copolymerization of a styrene monomer with (1) an acrylonitrile monomer, (2) an unsaturated carboxylic acid or its ester monomer or (3) a maleimide or N-substituted maleimide monomer in the presence of a specific catalyst provides a copolymer having a configuration wherein the above monomer (1), (2) or (3) is copolymerized onto the styrene repeating unit chain having a syndiotactic configuration, said copolymer being excellent in heat resistance, chemical resistance, impact resistance or the like, having high heat deformation temperature under heavy load and presenting good wettability whereby the objective improvement can be achieved. The present invention has been accomplished based on such findings.

DESCRIPTION OF THE INVENTION

The present invention provides a styrene copolymer which comprises a styrene repeating unit (a) represented by the general formula (I):

(wherein $R^1$ is a hydrogen atom, a halogen atom or a hydrocarbon group having not more than 20 carbon atoms, m is an integer of 1 to 3, and when m is plural, $R^1$s may be the same or different) and an acrylonitrile repeating unit (b) represented by the general formula (II-(b)):

(wherein $R^2$ is a hydrogen atom or a methyl group), an unsaturated carboxylic acid or its ester repeating unit (c) represented by the general formula (II-(c)):

(wherein $R^3$ is a hydrogen atom or a saturated hydrocarbon group having not more than 5 carbon atoms, $R^4$ is a hydrogen atom, a saturated hydrocarbon group having not more than 20 carbon atoms, a saturated hydrocarbon group having not more than 20 carbon atoms and at least one hydroxyl group, a benzyl group, a substituted benzyl group, a phenyl group or a substituted phenyl group) or a maleimide or N-substituted maleimide repeating unit (d) represented by the general formula (II-(d)):

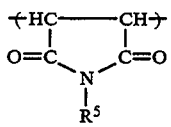
(II-(d))

(wherein $R^5$ is a hydrogen atom, a saturated hydrocarbon group having not more than 20 carbon atoms, a saturated hydrocarbon group having not more than 20 carbon atoms and at least one hydroxyl group, a benzyl group, a substituted benzyl group, a phenyl group or a substituted phenyl group), which contains 0.1 to 50 wt % of said repeating unit (b), (c) or (d), wherein intrinsic viscosity measured in 1,2,4-trichlorobenzene at 135° C. is 0.07 to 20 dl/g and stereoregularity of the styrene repeating unit (a) chain is a high degree of syndiotactic configuration.

Further, the present invention provides a process for producing the above styrene copolymer which comprises copolymerization of a styrene monomer represented by the general formula (I'):

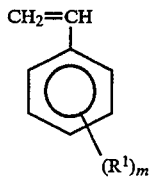
(I')

(wherein $R^1$ and m are the same as defined above) and an acrylonitrile monomer represented by the general formula (II'-(b)):

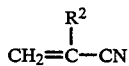
(II'-(b))

(wherein $R^2$ is the same as defined above), an unsaturated carboxylic acid or its ester monomer represented by the general formula (II'-(c)):

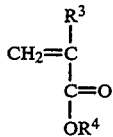
(II'-(c))

(wherein $R^3$ and $R^4$ are the same as defined above) or a maleimide or N-substituted maleimide monomer represented by the general formula (II'-(d)):

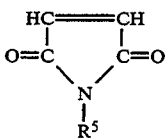
(II'-(d))

(wherein $R^5$ is the same as defined above) in the presence of a catalyst comprising a titanium compound and alkylaluminoxane.

BEST MODE TO CONDUCT THE INVENTION

As mentioned above, the styrene copolymer of the present invention may be roughly divided into three groups, that is, a styrene copolymer A which comprises a styrene repeating unit (a) represented by the general formula (I) and an acrylonitrile repeating unit (b) represented by the general formula (II-(b)); a styrene copolymer B which comprises the styrene repeating unit (a) and an unsaturated carboxylic acid or its ester repeating unit (c) represented by the general formula (II-(c)); and a styrene copolymer C which comprises the styrene repeating unit (a) and a maleimide or N-substituted maleimide repeating unit (d) represented by the general formula (II-(d)).

In this case, the repeating unit represented by the general formula (I), which is common to the above styrene copolymers A, B and C, is derived from the styrene monomer represented by the above general formula (I'). In the formula, $R^1$ is a hydrogen atom, a halogen atom (for example, chlorine, bromine, fluorine, iodine) or a hydrocarbon group having not more than 20 carbon atoms, preferably, 10 to 1 carbon atoms (for example, a saturated hydrocarbon group (particularly an alkyl group) such as methyl, ethyl, propyl, butyl, pentyl, hexyl or an unsaturated hydrocarbon group such as vinyl). The example of the repeating unit represented by the general formula (I) includes a styrene unit, an alkylstyrene unit such as p-methylstyrene unit, m-methylstyrene unit, o-methylstyrene unit, 2,4-dimethylstyrene unit, 2,5-dimethylstyrene unit, 3,4-dimethylstyrene unit, 3,5-dimethylstyrene unit, p-ethylstyrene unit, m-ethylstyrene unit, p-tert-butylstyrene unit; p-divinylbenzene unit, m-divinylbenzene unit, trivinylbenzene unit, a halogenated styrene unit such as p-chlorostyrene unit, m-chlorostyrene unit, o-chlorostyrene unit, p-bromostyrene unit, m-bromostyrene unit, o-bromostyrene unit, p-fluorostyrene unit, m-fluorostyrene unit, o-fluorostyrene unit, o-methyl-p-fluorostyrene unit; or a mixture of two or more of them.

On the other hand, the repeating unit (b) represented by the general formula (II-(b)) is derived from the acrylonitrile monomer represented by the above general formula (II'-(b)). The example of this acrylonitrile monomer includes, for example, acrylonitrile or methacrylonitrile.

The repeating unit (c) represented by the general formula (II-(c)) is derived from the unsaturated carboxylic acid or its ester monomer represented by the above general formula (II'-(c)). The example of this unsaturated carboxylic acid or its ester monomer includes, for example, acrylic acid, acrylic acid alkyl esters such as methyl acrylate, ethyl acrylate, n-butyl acrylate, isobutyl acrylate, sec-butyl acrylate, tert-butyl acrylate, 2-ethylhexyl acrylate, octyl acrylate, acrylic acid alkyl ester containing hydroxyl group such as 2-hydroxyethyl acrylate, phenyl acrylate, benzyl acrylate and methacrylic acid or methacrylate corresponding to the above acrylate.

The repeating unit (d) represented by the general formula (II-(d)) is derived from a maleimide or N-substituted maleimide monomer represented by the general formula (II'-(d)). The example of such maleimide or N-substituted maleimide includes, for example, maleimide, N-methyl maleimide, N-ethyl maleimide, N-tert-butyl maleimide, N-phenyl maleimide.

In the copolymer of the present invention, the styrene repeating unit (a) may be composed of two or more components, which applies to the repeating units (b), (c) and (d). Thus, bi-, ter- or tetra-copolymer can be synthesized. The content of the above repeating unit (b), (c)

or (d) is generally 0.1 to 50 wt %, preferably 1.0 to 20 wt % of the whole copolymer.

When the content of the repeating unit (b) in the copolymer A is less than 0.1 wt %, the improvements such as impartment of flexibility can not be sufficiently attained. On .the other hand, when it is over 50 wt %, crystallization is inhibited and chemical resistance, which is a characteristic of the styrene polymer having a syndiotactic configuration, may be degraded. Further, it may often cause coloring (yellowing) during molding, providing defects in physical properties like the conventional acrylonitrile polymer.

When the content of the repeating unit (c) in the copolymer B is less than 0.1 wt %, the improvements such as raising of glass transition temperature or heat deformation temperature can not be sufficiently attained. On the other hand, when it is over 50 wt %, crystallization is inhibited and chemical resistance, which is a characteristic of the styrene polymer having a syndiotactic configuration, may be degraded. Further, it may often cause coloring (yellowing) during molding, providing defects in physical properties like the conventional unsaturated carboxylic acid or its ester polymer.

When the content of the repeating unit (d) in the copolymer C is less than 0.1 wt %, the improvements such as raising of glass transition temperature or heat deformation temperature can not be sufficiently attained. On the other hand, when it is over 50 wt %, crystallization is inhibited and chemical resistance, which is a characteristic of the styrene polymer having a syndiotactic configuration, may be degraded and the product may become brittle, providing defects in physical properties like the conventional maleimide or N-substituted maleimide polymer.

As for the molecular weight of the copolymers A, B and C, intrinsic viscosity measured in 1,2,4-trichlorobenzene solution (135° C.) is generally 0.07 to 20 dl/g, preferably, 0.3 to 10 dl/g. When intrinsic viscosity is less than 0.07 dl/g, the product can not be practically used because o its poor dynamic properties. When intrinsic viscosity is over 20 dl/g, it is difficult to carry out the conventional melt molding.

In the present invention, the third component can be added as long as the properties of the resulting copolymer or the syndiotactic configuration of the styrene repeating unit (a) chain are not markedly degraded. Such compounds include, for example, dienes, vinylsiloxanes, unsaturated carboxylic acid esters, olefins for the copolymer A; dienes, vinylsiloxanes, olefins, acrylonitriles for the copolymer B; and dienes, vinylsiloxanes, olefins, unsaturated carboxylic acid esters, acrylonitriles for the copolymer C.

The styrene copolymers of the present invention (copolymers A, B and C) have a styrene repeating unit (a) chain having a high degree of syndiotactic configuration. Here, a high degree of syndiotactic configuration in the styrene polymer means that stereochemical structure is a high degree of syndiotactic configuration, that is, the stereostructure in which phenyl groups or substituted phenyl groups as side chains are located alternately in opposite directions relative to the main chain consisting of carbon—carbon bonds. Tacticity is quantitatively determined by the nuclear magnetic resonance method ($^{13}$C-NMR method) using carbon isotope. The tacticity measured by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. In the styrene copolymer having a high degree of syndiotactic configuration in the present invention, the proportion of racemic diad is at least 75%, preferably at least 85%, or proportions of racemic pentad is at least 30% and preferably at least 50%. However, the degree of syndiotacticity may somewhat vary depending on the types of the substituent or content of the repeating unit (b), (c) or (d).

The copolymers of the present invention described above with the desired stereoregularity and reactive substituents can be produced by copolymerization of the repeating unit (a) and the monomer corresponding to the repeating units (b), (c) or (d), and fractionation, blend or application of techniques of organic synthesis using the resulting copolymer as a starting material.

Among them, the above-described process of the present invention more efficiently provides the styrene copolymer of high quality.

The starting monomer used in the process for production of the present invention is a styrene monomer represented by the general formula (I') and a monomer represented by the general formula (II'-(b)), (II'-(c)) or (II'-(d)). The styrene monomer and the acrylonitrile monomer represented by the general formula (II'-(b)) are copolymerized to constitute the corresponding repeating units (a) and (b) in the copolymer A. The styrene monomer and the unsaturated carboxylic acid or its ester monomer represented by the general formula (II'-(c)) are copolymerized to constitute the corresponding repeating units (a) and (c) in the copolymer B. Further, the styrene monomer and maleimide or N-substituted maleimide monomer represented by the general formula (II'-(d)) are copolymerized to constitute the corresponding repeating units (a) and (d) in the copolymer C.

Accordingly, examples of such styrene monomer, acrylonitrile monomer, unsaturated carboxylic acid or its ester monomer, or maleimide or N-substituted maleimide monomer include those corresponding to the examples described for the above repeating untis (a), (b), (c) and (d).

In the process of the present invention, these monomers are used as starting materials and copolymerized in the presence of a catalyst containing a titanium compound (A) and alkylaluminoxane (B) as main components. The catalyst herein used is the same as that specifically described in Japanese Patent Application Laid-Open No. 241009/1988. In this case, component (A), i.e., a titanium compound includes various compounds, preferably at least one compound selected from a group consisting of titanium compounds or titanium chelate compounds represented by the general formula:

   (α)

or

   (β)

(wherein $R^6$, $R^7$, $R^8$ and $R^9$ represent independently a hydrogen, an alkyl group having 1 to 20 carbon atoms, an alkoxy group having 1 to 20 carbon atoms, an aryl group, an alkylaryl group and an arylalkyl group each having 6 to 20 carbon atoms, an acyloxy group having 1 to 20 carbon atoms, a cyclopentadienyl group, a substituted cyclopentadienyl group or an indenyl group or halogen, and a, b and c are independently an integer of 0 to 4, and d and e are independently an integer of 0 to 3).

$R^6$, $R^7$, $R^8$ and $R^9$ in the above formula (α) or (β) represent a hydrogen atom, an alkyl group having 1 to 20 carbon atoms (e.g., methyl, ethyl, propyl, butyl, amyl, isoamyl, isobutyl, octyl, 2-ethylhexyl), an alkoxy group having 1 to 20 carbon atoms (e.g., methoxy, ethoxy, propoxy, butoxy, amyloxy, hexyloxy, 2-ethylhexyloxy), an aryloxy group having 6 to 20 carbon atoms (e.g., phenoxy), an aryl group, an alkylaryl group and an arylalkyl group having 6 to 20 carbon atoms (e.g., phenyl, tolyl, xylyl, benzyl), an acyloxy group having 1 to 20 carbon atoms (e.g., heptadecylcarbonyloxy), a cyclopentadienyl group, a substituted cyclopentadienyl group (e.g., methylcyclopentadienyl, 1,2-dimethylcyclopentadienyl, pentamethylcyclopentadienyl), an indenyl group, halogen (e.g., chlorine, bromine, iodine or fluorine). $R^6$, $R^7$, $R^8$ and $R^9$ may be the same or different. a, b and c are independently an integer of 0 to 4, and d and e are independently an integer of 0 to 3.

More preferable examples include a titanium compound represented by the general formula:

$$TiRXYZ \qquad (Y)$$

(wherein R is a cyclopentadienyl group, a substituted cyclopentadienyl group or an indenyl group, and X, Y and Z are independently a hydrogen atom, an alkyl group having 1 to 12 carbon atoms, an alkoxy group having 1 to 12 carbon atoms, an aryl group having 6 to 20 carbon atoms, an aryloxy group having 6 to 20 carbon atoms, an arylalkyl group having 6 to 20 carbon atoms or a halogen atom). The substituted cyclopentadienyl group represented by R in the above formula, for example, is a cyclopentadienyl group substituted by at least one alkyl group having 1 to 6 carbon atoms, specifically methylcyclopentadienyl group, 1,2-dimethylcyclopentadienyl group, pentamethylcyclopentadienyl group or the like. In addition, X, Y and Z are independently a hydrogen atom, an alkyl group having 1 to 12 carbon atoms (specifically, methyl, ethyl, propyl, n-butyl, isobuty, amyl, isoamyl, octyl, 2-ethylhexyl group, etc.), an alkoxy group having 1 to 12 carbon atoms (specifically, methoxy, ethoxy, propoxy, butoxy, amyloxy, hexyloxy, octyloxy, 2-ethylhexyloxy, etc.), an aryl group having 6 to 20 carbon atoms (specifically, phenyl, naphthyl, etc.), an aryloxy group having 6 to 20 carbon atoms (specifically, phenoxy, etc.), an arylalkyl group having 6 to 20 carbon atoms (specifically, benzyl, etc.), or a halogen atom (specifically, chlorine, bromine, iodine or fluorine).

Specific examples of the titanium compound represented by the general formula (Y) are
cyclopentadienyltrimethyltitanium,
cyclopentadienyltriethyltitanium,
cyclopentadienyltripropyltitanium,
cyclopentadienyltributyltitanium,
methylcyclopentadienyltrimethyltitanium,
1,2-dimethylcyclopentadienyltrimethyltitanium,
pentamethylcyclopentadienyltrimethyltitanium,
pentamethylcyclopentadienyltriethyltitanium,
pentamethylcyclopentadienyltripropyltitanium,
pentamethylcyclopentadienyltributyltitanium,
cyclopentadienylmethyltitanium dichloride,
cyclopentadienylethyltitanium dichloride,
pentamethylcyclopentadienylmethyltitanium dichloride,
pentamethylcyclopentadienylethyltitanium dichloride,
cyclopentadienyldimethyltitanium monochloride,
cyclopentadienyldiethyltitanium monochloride,
cyclopentadienyltitanium trimethoxide,
cyclopentadienyltitanium triethoxide,
cyclopentadienyltitanium tripropoxide,
cyclopentadienyltitanium triphenoxide,
pentamethylcyclopentadienyltitanium trimethoxide,
pentamethylcyclopentadienyltitanium triethoxide,
pentamethylcyclopentadienyltitanium tripropoxide,
pentamethylcyclopentadienyltitanium tributoxide,
pentamethylcyclopentadienyltitanium triphenoxide,
cyclopentadienyltitanium trichloride,
pentamethylcyclopentadienyltitanium trichloride,
cyclopentadienylmethoxytitanium dichloride,
cyclopentadienyldimethoxytitanium chloride,
pentamethylcyclopentadienylmethoxytitanium dichloride,
cyclopentadienyltribenzyltitanium,
pentamethylcyclopentadienylmethyldiethoxytitanium,
indenyltitanium trichloride, indenyltitanium trimethoxide,
indenyltitanium triethoxide, indenyltrimethyltitanium,
indenyltribenzyltitanium and the like.

Among these titanium compounds, a compound containing no halogen atom is preferred, and a titanium compound having one π-electron ligand as described above is particularly preferred.

Aluminoxane which is used as the component (B) in combination with the above titanium compound is a reaction product of an alkylaluminum compound and water, and more specifically, it includes chain-like alkyl-aluminoxanes represented by the general formula:

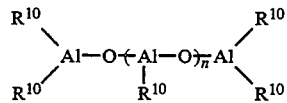

(wherein n represents a degree of polymerization and is a number of 2 to 50, $R^{10}$ represents an alkyl group having 1 to 8 carbon atoms), or cyclic alkylaluminoxanes having a repeating unit represented by the general formula:

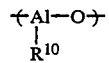

In general, the contact product of the alkylaluminoxane and water such as trialkylaluminum is a mixture of the above-described chain-like alkylaluminoxane and cyclic alkyl aluminoxane and unreacted trialkylaluminum, various condensed products, or further molecules in which the above components have a complex association, and it becomes various products with the contact conditions of trialkylaluminum and water.

The reaction between alkylaluminum and water is not particularly limited and carried out according to the known methods. For example, there are methods such as (1) the method in which alkylaluminum is dissolved in an organic solvent and the resulting solution is contacted with water, (2) the method in which alkylaluminum is first added at the time of polymerization, and then water is added thereto, and (3) the method in which water of crystallization contained in a metal salt and the like or water absorbed in an inorganic material or an organic material is reacted with alkylaluminum. In the above water, ammonia, amine such as ethylamine, a sulfur compound such as hydrogen sulfide and a phosphorus compound such as phosphite may be contained in an amount up to 20%.

The preferred alkylaluminoxane to be used as the above component (B) is preferred by the method in which, when a hydrated compound is used, the resultant solid residue is removed by filtration after the above contact reaction and the filtrate is heated under atmospheric pressure or reduced pressure at a temperature of 30° to 200° C., preferably, at 40° to 150° C. for 20 minutes to 8 hours, preferably 30 minutes to 5 hours while solvent is distilled off. The temperature for the heat treatment may be determined optimally depending on various conditions, but usually the above range can be used. If the temperature is less than 30° C., effects cannot be obtained, and if it exceeds 200° C., aluminoxane itself is pyrolyzed, which is undesirable. Depending on the conditions of the heat treatment, the reaction product can be obtained as a colorless solid or solution. The product thus obtained can be used as a catalyst solution, if necessary, by dissolving or diluting with hydrocarbon solvent.

Suitable example of alkylaluminoxane is alkylaluminoxane in which the high magnetic field component in the methyl proton signal region due to the aluminum-methyl group ($Al-CH_3$) bond as observed by the proton nuclear magnetic resonance method is not more than 50%. That is, in a proton nuclear magnetic resonance ($^1H$-NMR) spectral analysis of the above contact product in toluene at room temperature, the methyl proton signal due to $Al-CH_3$ is observed in the region of 1.0 to −0.5 ppm (tetramethylsilane (TMS) standard). Since the proton signal of TMS (0 ppm) is observed in the region in which the methyl proton due to $Al-CH_3$ is observed, this methyl proton signal due to $Al-CH_3$ is measured based on the methyl proton signal of toluene (2.35 ppm) based on TMS standard, and when divided into the high magnetic field component (i.e. −0.1 to −0.5 ppm) and the other magnetic field component (i.e. 1.0 to −0.1 ppm), alkylaluminoxane in which said high magnetic field component is not more than 50%, preferably 45 to 5% of the total signal area is preferably used as the component (B) of the catalyst in the process of the present invention.

The catalysts to be used in the process of the present invention contain the above components (A) and (B) as the main components. Other catalyst components, for example, trialkylaluminum represented by the general formula:

$$AlR^{11}_3$$

(wherein $R^{11}$ is an alkyl group having 1 to 8 carbon atoms), or other organometallic compounds can be added, if desired.

When this catalyst is used, the ratio of the component (A) to the component (B) in the catalyst varies with the type of component, the type of styrene monomer represented by the general formula (I') and each monomer represented by the general formula (II'-(b)), (II'-(c)) or (II'-(d)) as the starting materials, and other conditions, and thus cannot be determined unconditionally. Usually, the ratio of aluminum contained in component (B) to titanium contained in component (A), i.e. aluminum/titanium (molar ratio) is 1 to $10^6$, preferably 10 to $10^4$.

In accordance with the process of the present invention, the styrene monomer represented by the above general formula (I') and monomer represented by the general formula (II'-(b)), (II'-(c)) or (II'-(d)) are copolymerized in the presence of a catalyst containing components (A) and (B) as the main components. This copolymerization may be carried out in various methods such as bulk copolymerization, solution copolymerization or suspension copolymerization. Solvents which may be used for copolymerization include aliphatic hydrocarbons such as pentane, hexane, heptane and the like; alicyclic hydrocarbons such as cyclohexane and the like; or aromatic hydrocarbons such as benzene, toluene, xylene and the like. The polymerization temperature is not particularly limited, but generally, 0° to 100° C., preferably, 10° to 70° C. The polymerization time is 5 minutes to 24 hours, preferably at least one hour.

Further, it is effective to conduct the copolymerization in the presence of hydrogen to control the molecular weight of the resulting styrene copolymer.

The styrene copolymer obtained by the process of the present invention has a high degree of syndiotacticity of the styrene repeating unit chain. After polymerization, the copolymer may be deashed with a washing solution containing hydrochloric acid or the like, if necessary, and after washing, drying under reduced pressure, the solubles may be removed by washing with a solvent such as methyl ethyl ketone or the like to obtain styrene copolymer of high purity having an extremely high degree of syndiotacticity.

The present invention will be described in more detail with reference to examples.

EXAMPLES 1

(1) Preparation of Methylaluminoxane

In a 500-milliliter glass vessel which had been purged with argon were placed 200 ml of toluene, 17.7 g (g=grams) (71 mmol) of copper sulfate pentahydrate ($CuSO_4.5H_2O$) and 24 ml (250 mmol) of trimethylaluminum, which were then reacted at 40° C. for 3 hours. Then, solid component was separated from the reaction mixture, and toluene was distilled away from the solution as obtained above under reduced pressure at room temperature to obtain 6.7 g of a contact product. The molecular weight of the product as determined by the freezing point depression method was 610.

As for the high magnetic field component as determined by the above $^1H$-NMR method, methyl proton signal due to ($Al-CH_3$) bond as observed by the proton nuclear magnetic resonance spectrum in a toluene solution at room temperature was found in the region from 1.0 to −0.5 ppm (tetramethylsilane standard). Since the proton signal of tetramethylsilane (0 ppm) was found in the observation region due to methyl proton due to ($Al-CH_3$) bond, this methyl proton signal due to ($Al-CH_3$) bond was determined based on the methyl proton signal of toluene (2.35 ppm) (tetramethylsilane standard) and divided into high magnetic field component (i.e., −0.1 to −0.5 ppm) and the other magnetic field component (i.e., 1.0 to −0.1 ppm). The high magnetic field component was 43%.

(2) Production of Styrene-Acrylonitrile Copolymer

In a 0.5-liter reactor equipped with a stirrer were placed 120 ml of styrene and 10.0 mmol as aluminum atom of methylaluminoxane obtained in (1) above, and stirred at the polymerization temperature of 40° C. for 30 minutes. Then, 0.05 mmol as titanium atom of pentamethylcyclopentadienyltitanium trimethoxide was added. Further, 80 ml of acrylonitrile was added. Then, polymerization was carried out at 70° C. for 4 hours with stirring. After the reaction was over, methanol was poured to cease the reaction. Further, a mixture of methanol and hydrochloric acid was added to decompose the catalyst component, and washing with methanol was repeated three times. The yield of thus obtained styrene-acrylonitrile copolymer was 12.5 g. Intrinsic viscosity measured in 1,2,4-trichlorobenzene solution at 135° C. was 1.48 dl/g.

The fact that the styrene chain of this styrene-acrylonitrile copolymer has a syndiotactic configuration was certified by the results of differential scanning calorimeter (DSC) and carbon nuclear magnetic resonance spectrum (NMR).

(a) Determination by DSC

After the styrene copolymer obtained in Example 1 was sufficiently dried, then 10 mg portion was charged in a vessel for DSC. The temperature was raised from 50° C. to 300° C. at a rate of 20° C./min, then kept at 300° C. for 5 minutes, and reduced from 300° C. to 50° C. at a rate of 20° C./min. This sample was heated again from 50° C. to 300° C. at a rate of 20° C./min, and the endo- and exo-thermic pattern was observed. The apparatus used was DSC-II manufactured by Perkin-Elmer.

As the result, the glass transition temperature and the melt temperature (melting point) of this copolymer were 102° C. and 268° C., respectively.

The facts that the conventional atactic polystyrenes have no melt temperature, the melt temperature of isotactic polystyrene is 230° C. and the melt temperature of the copolymer never exceeds the higher melt temperature of homopolymers show that the styrene chain of this copolymer has a syndiotactic configuration and the copolymer is crystalline substance.

(b) Determination of Infrared Spectrum

The styrene copolymer obtained in Example 1 was press molded by mini-press manufactured by Toyo Seiki Co., Ltd. at a heater temperature of 300° C. to obtain a specimen (10×20 mm, 1.5 mm thick). The specimen was determined using an infrared spectrophotometer type A-202 manufactured by Nippon Bunko Co., Ltd. As the result, absorption characteristic of cyano group, peaks due to aromatic ring and crystalline polyolefin were observed at 2,250 $cm^{-1}$, 1,603 $cm^{-1}$ and 1,225 $cm^{-1}$, respectively.

(c) Determination by $^{13}$C-NMR

The above styrene copolymer was analyzed in 1,2,4-trichlorobenzene solution at 135° C. As the result, the aromatic signals were observed at 145.1 ppm and 145.9 ppm. Accordingly, the styrene chain was confirmed to have a syndiotactic configuration. The content of the acrylonitrile chain in the copolymer was 7.0 wt %. The apparatus used was FX-200 manufactured by Nippon Denshi Co., Ltd.

(d) Determination of Elongation

The above styrene copolymer was pelletized using a biaxial kneader at a cylinder temperature of 300° C. Injection molding was conducted at a cylinder temperature of 300° C. using the resulting pellet to obtain a specimen. The specimen was determined according to JIS-K7113. As the result, elongation was 4.1%.

(e) Determination of Critical Surface Tension

The above styrene copolymer was melted at 300° C. to prepare a press sheet. Critical surface tension of this sheet was determined by droplet shape method using ethyl benzoate/ethylene glycol/formalin/water. The result was 37 dyne/cm, which is-higher than that of syndiotactic polystyrene (33 dyne/cm). Generally, critical surface tension is considered as an index of adhesion of the resin. Accordingly, the copolymer was found to be improved in adhesion and compatibility.

These facts show that the copolymer is a crystalline styrene-acrylonitrile copolymer which contains styrene chain having syndiotactic configuration.

COMPARATIVE EXAMPLES 1 TO 3 AND EXAMPLE 2

The procedure of Example 1 was repeated using starting materials, catalysts and polymerization conditions shown in Table 1, to obtain styrene-acrylonitrile copolymers. the characteristics of the resulting copolymers as well as the result of Example 1 are shown in Table 1.

EXAMPLE 3

(a) Production of p-Methylstyrene-Acrylonitrile Copolymer

In a 0.5-liter reactor equipped with a stirrer were placed 30 ml of p-methylstyrene and 5.0 mmol as aluminum atom of methylaluminoxane obtained in the above Example 1 (1), and the resultant was stirred at polymerization temperature of 50° C. for 30 minutes. Subsequently, 0.05 mmol as titanium atom of pentamethylcyclopentadienyltitanium trimethoxide was added. Eight minutes after beginning of the reaction, 3.0 ml of acrylonitrile was further added. Then, polymerization was carried out at 50° C. for one hour with stirring. After the reaction was over, methanol was poured to stop the reaction. Further, a mixture of methanol and hydrochloric acid was poured to decompose the catalytic components. Then, washing with methanol was repeated three times.

The yield of thus obtained p-methylstyrene-acrylonitrile copolymer was 2.4 g. Intrinsic viscosity measured in 1,2,4-trichlorobenzene at 135° C. was 0.57 dl/g.

(b) Determination by DSC

The p-methylstyrene-acrylonitrile copolymer obtained in the above Example 3 (a) was analyzed under the same conditions as those in Example 1 (2). As the result, glass transition temperature of the copolymer was 109° C. The melt peak was not observed under the present conditions.

(c) Determination of Infrared Spectrum

The above p-methylstyrene-acrylonitrile copolymer was analyzed under the same conditions as those in Example 1 (2). As the result, absorption characteristic of cyano group and a peak due to aromatic ring were observed at 2,250 $cm^{-1}$ and 1,603 $cm^{-1}$, respectively.

(d) Determination by 13C-NMR

The above p-methylstyrene-acrylonitrile copolymer was analyzed under the same conditions as those in Example 1 (2). As the result, a pointed peak was observed in the range from 145.3 ppm to 145.5 ppm. Accordingly, the p-methyl chain was confirmed to have a syndiotactic configuration. The content of the acrylonitrile chain in the copolymer was 3.5 wt %.

EXAMPLE 4

Starting materials and monomers shown in the following Table 2 were used to obtain styrene copolymers. The copolymerization conditions were the same as those in Example 3.

EXAMPLE 5

In the same polymerization procedure as that in Example 1, with the exception that 50 ml of toluene was used as a solvent, copolymerization was carried out under the conditions shown in the following Table 2. The resulting copolymer was extracted by Soxhlet extraction using methylethylketone and dimethylformamide in this order. When dimethylformamide was used, extraction was carried out under reduced pressure to keep boiling point at 100° C. The extractability was 42.5%.

The extraction residue was completely dried, and analyzed in the same manner as that in Example 1. The results as well as the results of Examples 3 and 4 are shown in Table 2.

EXAMPLE 6

(1) Preparation of Styrene-Methyl Methacrylate Copolymer

In a 0.5-liter reactor equipped with a stirrer were placed 100 ml of styrene and 10.0 mmol as aluminum atom of methylaluminoxane obtained in the above Example 1 (1), and the resultant was stirred at the polymerization temperature of 40° C. for 30 minutes. Subsequently, 0.05 mmol as titanium atom of pentamethylcyclopentadienyltitanium trimethoxide was added, followed by 100 ml of methyl methacrylate. Then, polymerization was carried out at 70° C. for 4 hours with stirring. After the reaction was over, methanol was poured to stop the reaction. Further, a mixture of methanol-hydrochloric acid was added to decompose the catalyst components. Then, washing with methanol was

TABLE 1

| | Catalyst | | | Monomer | | | |
| | Titanium Compound | | MAO[d] | Styrene Monomer | | Comonomer | |
| No. | Type | Amount (mmol) | Amount (mmol) | Type | Amount (mol) | Type | Amount (mol) |
|---|---|---|---|---|---|---|---|
| Example 1 | Cp*Ti(OCH$_3$)$_3$[a] | 0.05 | 10 | Styrene | 0.87 | Acrylonitrile | 1.00 |
| Comparative Example 1 | Cp*Ti(OCH$_3$)$_3$[a] | 0.0075 | 1.5 | Styrene | 1.73 | — | — |
| Comparative Example 2 | Ti(OC$_2$H$_5$)$_4$[b] | 0.05 | 40 | Styrene | 0.87 | Acrylonitrile | 0.94 |
| Comparative Example 3 | AIBN[c] | 1.0 | — | Styrene | 0.87 | Acrylonitrile | 0.50 |
| Example 2 | Cp*Ti(OCH$_3$)$_3$[a] | 0.05 | 10 | Styrene | 0.87 | Acrylonitrile | 1.50 |

| | | | | Copolymer | | | | |
| No. | Polymerization Temp. (°C.) | Yield (g) | Intrinsic[e] Viscosity (dl/g) | Content of Comonomer (wt %) | Glass Transition Temp. (°C.) | Melt Temp. (°C.) | Elongation (%) | Critical Surface Tension (dyne/cm) |
|---|---|---|---|---|---|---|---|---|
| Example 1 | 40 | 12.5 | 0.48 | 7.00 | 102 | 268 | 4.1 | 37 |
| Comparative Example 1 | 70 | 25.4 | 1.68 | — | 97 | 270 | 1.7 | 33 |
| Comparative Example 2 | 60 | 0.3 | 0.60 | ~0 | *[f] | *[f] | *[f] | *[f] |
| Comparative Example 3 | 60 | 78.2 | 1.24 | 6.00 | 100 | — | 3.0 | 37 |
| Example 2 | 30 | 15.7 | 1.87 | 15.00 | 105.0 | 267 | 4.7 | 38 |

[a] Pentamethylcyclopentadienyltitanium trimethoxide
[b] Tetraethoxytitanium
[c] Azoisobutyronitrile
[d] Methylaluminoxane
[e] Measured in 1,2,4-trichlorobenzene at 135° C.
[f] Measurement could not be conducted due to insufficient sample.

TABLE 2

| | Catalyst | | | Monomer | | | |
| | Titanium Compound | | MAO[d] | Styrene Monomer | | Comonomer | |
| No. | Type | Amount (mmol) | Amount (mmol) | Type | Amount (mol) | Type | Amount (mol) |
|---|---|---|---|---|---|---|---|
| Example 3 | Cp*Ti(OCH$_3$)$_3$[a] | 0.05 | 5 | p-Methylstyrene | 0.23 | Acrylonitrile | 0.03 |
| Example 4 | Cp*Ti(OCH$_3$)$_3$[a] | 0.05 | 5 | Styrene | 0.22 | Methacrylonitrile | 0.03 |
| Example 5[h] | Cp*Ti(OCH$_3$)$_3$[a] | 0.05 | 5 | Styrene | 0.26 | Acrylonitrile | 0.76 |

| | | | | Copolymer | | | | |
| No. | Polymerization Temp. (°C.) | Yield (g) | Intrinsic[e] Viscosity (dl/g) | Content of Comonomer (wt %) | Glass Transition Temp. (°C.) | Melt Temp. (°C.) | Elongation (%) | Critical Surface Tension (dyne/cm) |
|---|---|---|---|---|---|---|---|---|
| Example 3 | 50 | 5.2 | 0.57 | 3.5 | 109 | — | — | — |
| Example 4 | 50 | 3.2 | 2.19 | 2.3 | — | 268 | — | — |
| Example 5[h] | 50 | 1.7[i] | 0.46[i] | 1.6[i] | — | 266[i] | — | — |

[a], [d] and [e] are the same as described in Table 1.
[h] Toluene (50 ml) was used as a solvent.
[i] Results of methylethylketone and dimethylformamide extraction residue.

repeated three times. The yield of thus obtained styrene-methyl methacrylate copolymer was 4.3 g. Intrinsic viscosity measured in 1,2,4-trichlorobenzene at 135° C. was 0.48 dl/g.

The fact that styrene chain of this styrene-methyl methacrylate copolymer has a syndiotactic configuration was certified by the result of analysis by differential scanning calorimeter (DSC) and nuclear magnetic resonance spectrum (NMR).

(a) Determination by DSC

After the styrene copolymer obtained in Example 6 was completely dried, 10 mg portion was charged in a vessel for DSC. The temperature was raised from 50° C. to 300° C. at a rate of 20° C./min, then kept at 300° C. for 5 minutes, and reduced from 300° C. to 50° C. at a rate of 20° C./min. This sample was heated again from 50° C. to 300° C. at a rate of 20° C./min, and the endo- and exo-thermic pattern was observed. The apparatus used was DSC-II manufactured by Perkin-Elmer Co.

As the result, the glass transition temperature and the melt temperature of this copolymer were 110° C. and 267° C., respectively.

The facts that the conventional atactic polystyrenes do not have melt temperature, the melting temperature of isotactic polystyrene is 230° C. and the melting temperature of the copolymer never exceeds the higher melting temperature of homopolymers show that the styrene chain of this copolymer has a syndiotactic configuration and the copolymer is crystalline substance.

(b) Determination by $^{13}$C-NMR

The above styrene copolymer was analyzed in 1,2,4-trichlorobenzene solution at 135° C. As the result, the aromatic signals were observed at 145.1 ppm and 145.9 ppm. Accordingly, the styrene chain was confirmed to have a syndiotactic configuration. Further, peaks due to methyl methacrylate were found at 22.4 ppm ($\alpha$-methyl), 45.9 ppm (quaternary carbon) and 50.7 ppm (methoxy group). The content of methyl methacrylate chain in the copolymer was 5.0 wt %. The apparatus used was FX-200 manufactured by Nippon Denshi Co., Ltd.

(c) Determination of Heat Deformation Temperature (HDT)

The above styrene copolymer was pelletized using a biaxial kneader at a cylinder temperature of 300° C. The resulting pellet was injection molded at a cylinder temperature of 300° C. to obtain a specimen. The specimen was heat treated at 230° C. for 10 minutes, then analyzed according to JIS-K7207. As the result, HDT was 115° C. at 18.5 kg/cm$^2$ and 215° C. at 4.6 kg/cm$^2$. HDT of syndiotactic polystyrene has been confirmed to be about 100° C. It is obvious that HDT was improved by copolymerization.

(d) Determination of Critical Surface Tension

The above styrene copolymer was melted at 300° C. to prepare a press sheet. Critical surface tension of this sheet was determined by droplet shape method using ethyl benzoate/ethylene glycol/formalin/water. The result was 35 dyne/cm, which was higher than that of syndiotactic polystyrene (33 dyne/cm).

Generally, critical surface tension is considered as an index of adhesion of the resin. Accordingly, the copolymer was found to be improved in adhesion and compatibility.

These facts show that the copolymer is a crystalline styrene-methyl methacrylate copolymer which contains styrene chain having a syndiotactic configuration, whose heat deformation temperature under heavy load as well as adhesion are improved by raising glass transition temperature.

COMPARATIVE EXAMPLES 4 TO 6 AND EXAMPLE 7

The procedure of Example 6 was repeated using starting materials, catalyst and polymerization conditions shown in the following Table 3, and styrene-methyl methacrylate copolymers were obtained. The characteristics of the resulting copolymers as well as the result of Example 6 are shown in Table 3.

EXAMPLE 8

In the same manner as that in Example 6, copolymerization was carried out under the conditions shown in Table 4. The resulting copolymer was analyzed in the same manner as that in Example 6. The results are shown in Table 4.

In infrared absorption spectrum of methylethylketone extraction residue of the copolymer, a peak due to aromatic ring was observed at 1,603 cm$^{-1}$ and peaks due to carboxylic acid group of methacrylic acid were observed aroung 1,640 cm$^{-1}$ and around 3,670 cm$^{-1}$. In $^{13}$C-NMR analysis, aromatic signals were observed 145.1 and 145.9 ppm. Accordingly, the styrene chain was confirmed to have a syndiotactic configuration.

EXAMPLE 9

In a 0.5-liter reactor equipped with a stirrer were placed 30 ml of styrene and 5.0 mmol as aluminum atom of methylaluminoxane obtained in the above Example 1 (1), and the resultant was stirred at the polymerization temperature of 50° C. for 30 minutes. Subsequently, 0.05 mmol as titanium atom of pentamethylcyclopentadienyltitanium trimethoxide was added. Three minutes later, 5 ml of acrylic acid was further added. Then, polymerization was carried out at 50° C. for one hour with stirring. After the reaction was over, methanol was poured to stop the reaction. Further, a mixture of methanol-hydrochloric acid was added to decompose the catalyst components. Then, washing with methanol was repeated three times. The yield of thus obtained styrene-acrylic acid copolymer was 2.6 g. Intrinsic viscosity measured in 1,2,4-trichlorobenzene at 135° C. was 0.86 dl/g. The results are shown in Table 4.

The resulting copolymer was subjected to Soxhlet extraction for 8 hours using methanol as a solvent, and completely dried. The extractability was 1.5%.

In infrared absorption spectrum of the extraction residue copolymer, peaks due to a carboxylic acid group of acrylic acid were observed around 1,560 to 1,660 cm$^{-1}$ and around 3,670 cm$^{-1}$. In $^{13}$C-NMR analysis, the signals identical to those in Example 8 were found. Thus, the styrene chain was confirmed to have syndiotactic configuration.

EXAMPLES 10 AND 11

According to the same polymerization method as that in Example 9 using starting materials and monomers shown in Table 4, styrene copolymer was obtained. The results are shown in Table 4.

TABLE 3

| Catalyst | Monomer | Polymeri- |

TABLE 3-continued

| No. | Titanium Compound Type | Amount (mmol) | MAO[d] Amount (mmol) | Styrene Monomer Type | Amount (mol) | Comonomer Type | Amount (mol) | Polymerization Temp. (°C.) |
|---|---|---|---|---|---|---|---|---|
| Example 6 | Cp*Ti(OCH$_3$)$_3$[a] | 0.05 | 10 | Styrene | 0.87 | Methyl methacrylate | 0.94 | 40 |
| Comparative Example 4 | Cp*Ti(OCH$_3$)$_3$[a] | 0.0075 | 1.5 | Styrene | 1.73 | — | — | 70 |
| Comparative Example 5 | Ti(OC$_2$H$_5$)$_4$[b] | 0.05 | 40 | Styrene | 0.87 | Methyl methacrylate | 0.94 | 60 |
| Comparative Example 6 | AIBN[c] | 1.0 | — | Styrene | 0.87 | Methyl methacrylate | 0.50 | 60 |
| Example 7 | Cp*Ti(OCH$_3$)$_3$[a] | 0.05 | 10 | Styrene | 0.87 | Methyl methacrylate | 1.88 | 30 |

| No. | Yield (g) | Intrinsic[e] Viscosity (dl/g) | Content of Comonomer (wt %) | Glass Transition Temp. (°C.) | Melt Temp. (°C.) | Heat Deformation Temperature (°C.) ( 18.5 kg/cm$^2$ ) | ( 4.6 kg/cm$^2$ ) | Critical Surface Tension (dyne/cm) |
|---|---|---|---|---|---|---|---|---|
| Example 6 | 4.3 | 0.48 | 5.00 | 110 | 267 | 110 | 215 | 35 |
| Comparative Example 4 | 25.4 | 1.68 | — | 97 | 270 | 100 | 220 | 33 |
| Comparative Example 5 | 0.3 | 0.60 | ~0 | *[f] | *[f] | *[f] | *[f] | *[f] |
| Comparative Example 6 | 78.2 | 1.24 | 6.00 | 102 | — | 105 | 106 | 35 |
| Example 7 | 12.7 | 1.82 | 15.20 | 113 | 266 | 113 | 210 | 36 |

[a] to [f] are the same as described in Table 1

TABLE 4

| No. | Titanium Compound Type | Amount (mmol) | MAO[d] Amount (mmol) | Styrene Monomer Type | Amount (mol) | Comonomer Type | Amount (mol) | Polymerization Temp. (°C.) |
|---|---|---|---|---|---|---|---|---|
| Example 8 | Cp*Ti(OCH$_3$)$_3$[a] | 0.02 | 4 | Styrene | 0.72 | Methacrylic acid | 0.67 | 70 |
| Example 9 | Cp*Ti(OCH$_3$)$_3$[a] | 0.05 | 5 | Styrene | 0.24 | Acrylic acid | 0.07 | 50 |
| Example 10 | Cp*Ti(OCH$_3$)$_3$[a] | 0.05 | 5 | p-Methyl-styrene | 0.23 | Acrylic acid | 0.14 | 50 |
| Example 11 | Cp*Ti(OCH$_3$)$_3$[a] | 0.05 | 5 | Styrene | 0.24 | 2-Ethylhexyl acrylate | 0.07 | 50 |

| No. | Yield (g) | Intrinsic[e] Viscosity (dl/g) | Content of Comonomer (wt %) | Glass Transition Temp. (°C.) | Melt Temp. (°C.) | Heat Deformation Temperature (°C.) ( 18.5 kg/cm$^2$ ) | ( 4.6 kg/cm$^2$ ) | Critical Surface Tension (dyne/cm) |
|---|---|---|---|---|---|---|---|---|
| Example 8 | 10.5 | 0.65[j] | 5.0[j] | 105[j] | 265[j] | — | — | 39[j] |
| Example 9 | 2.6 | 0.86[k] | 21.5[k] | 88[k] | — | — | — | 40[k] |
| Example 10 | 4.6 | 2.52[l] | 3.5[l] | 113[l] | not[l] found | — | — | 40[l] |
| Example 11 | 5.0 | 2.93[m] | 3.0[m] | 87[m] | 268[m] | — | — | 38[m] |

[a] to [f] are the same as in Table 1
[j] The value of methylethylketone extraction residue; extractability, 35%
[k] The value of methanol extraction residue; extractability, 1.5%
[l] The value of methanol extraction residue; extractability, 1.7%
[m] The value of benzene extraction residue; extractability, 10.5%

EXAMPLE 12

(1) Preparation of Styrene-N-Phenylmaleimide Copolymer

In a 0.5-liter reactor equipped with a stirrer were placed 100 ml of styrene and 6.0 mmol as aluminum atom of methylaluminoxane obtained in the above Example 1 (1), and the resultant was stirred at the polymerization temperature of 30° C. for 30 minutes. Subsequently, 0.03 mmol as titanium atom of pentamethylcyclopentadienyltitanium trimethoxide was added. At the same time, 100 g of N-phenylmaleimide was dissolved in 300 ml of toluene, and after sufficiently replaced with nitrogen, this solution was added and polymerization was carried out at 40° C. for 5 hours with stirring. After the reaction was over, methanol was poured to stop the reaction. Further, a mixture of methanol-hydrochloric acid was added to decompose the catalyst components. Then, washing with methanol was repeated three times. The yield of thus obtained styrene-N-phenylmaleimide copolymer was 51.5 g. Intrinsic viscosity measured in 1,2,4-trichlorobenzene at 135° C. was 0.66 dl/g.

The fact that styrene chain of this styrene-N-phenylmaleimide copolymer has a syndiotactic configuration was certified by the result of analysis by differential scanning calorimeter (DSC) and nuclear magnetic resonance spectrum (NMR).

(a) Determination by DSC

After the styrene copolymer obtained in Example 12 was sufficiently dried, 10 mg portion was charged in a vessel for DSC. The temperature was raised from 50° C. to 300° C. at a rate of 20° C./min, then kept at 300° C. for 5 minutes, and reduced from 300° C. to 50° C. at a rate of 20° C./min. This sample was heated again from 50° C. to 300° C. at a rate of 20° C./min, and the endo- and exo-thermic pattern was observed. The apparatus Used was DSC-II manufactured by Perkin-Elmer Co.

As the result, the glass transition temperature and the melt temperature (Tm) of this copolymer were 115° C. and 270° C., respectively.

The facts that the conventional atactic polystyrene do not have melt temperature, the melting temperature of isotactic polystyrene is 230° C. and the melting temperature of the copolymer never exceeds the higher melting temperature of homopolymers show that the styrene chain of this copolymer has a syndiotactic configuration and the copolymer is crystalline substance.

(b) Determination by $^{13}$C-NMR

The above styrene copolymer was analyzed in 1,2,4-trichlorobenzene solution at 135° C. As the result, the aromatic signals were observed at 145.1 ppm and 145.9 ppm. Accordingly, the styrene chain was confirmed to have a syndiotactic configuration. Further, peaks due to N-phenylmaleimide chain were found at 175.0 ppm and 176.5 ppm. The content of N-phenylmaleimide chain in the copolymer was 8.0 wt %. The apparatus used was FX-200 manufactured by Nippon Denshi Co., Ltd.

(c) Determination of Heat Deformation Temperature (HDT)

The above styrene copolymer was pelletized using a biaxial kneader at a cylinder temperature of 300° C. The resulting pellet was injection molded at a cylinder temperature of 300° C. to obtain a specimen. The specimen was heat treated at 230° C. for 10 minutes, then analyzed according to JIS-K7207. As the result, HDT was 119° C. at 18.5 kg/cm$^2$ and 235° C. at 4.6 kg/cm$^2$.

HDT of syndiotactic polystyrene was confirmed to be about 100° C. It is obvious that HDT was improved by copolymerization.

(d) Heat Decomposability

For estimation of heat decomposability of the resulting copolymer, thermogravimetric analysis was carried out. Then milligram of sample was charged in a measuring sample tube, and heated at a rate of 20° C./min, under nitrogen atomosphere. The apparatus used was SSC/560GH manufactured by Daini Seiko Co., Ltd. As the result, decomposition starting temperature (Td) of the resulting copolymer was 360° C.

The above results show that the copolymer is a crystalline styrene-N-phenylmaleimide copolymer containing styrene chain having a syndiotactic configuration, which has improved HDT under heavy load by raising Tg and higher (Td-Tm) value than the conventional syndiotactic polystyrene by improvement of Td, which means that the range of set temperature during molding is widened, that is, moldability is improved.

COMPARATIVE EXAMPLES 7 TO 9 AND EXAMPLE 13

The procedure of Example 12 was repeated using the starting materials, catalysts and polymerization conditions shown in the following Table 5, and styrene-N-phenylmaleimide copolymer was obtained. The characteristics of the resulting copolymer as well as the results of Example 12 are shown in Table 5.

EXAMPLE 14

In a 0.5-liter reactor equipped with a stirrer were placed 30 ml of styrene and 5.0 mmol as aluminum atom of methylaluminoxane obtained in the above Example 1 (1), and the resultant was stirred at the polymerization temperature of 50° C. for 30 minutes. Subsequently, 0.05 mmol as titanium atom of pentamethylcyclopentadienyltitanium trimethoxide was added. After 8 minutes, 20 ml of toluene solution containing 1.1 g of N-(2-methylphenyl)-maleimide was added. Then, polymerization was carried out at 50° C. for one hour with stirring. After the reaction was over, methanol was poured to stop the reaction. Further, a mixture of methanol-hydrochloric acid was added to decompose the catalyst components. Then, washing with methanol was repeated three times. The yield of thus obtained styrene-N-phenylmaleimide copolymer was 2.4 g. Intrinsic viscosity measured in 1,2,4-trichlorobenzene at 135° C. was 6.88 dl/g. The results are shown in Table 6.

Then, Soxhlet extraction of the resulting copolymer using methylene chloride was carried out for 8 hours, and the resultant was sufficiently dried. Extractability was 15.0%. In infrared absorption spectrum of the extraction residue of the copolymer, absorption due to carbonyl group of N-(2-methylphenyl)-maleimide was observed around 1,704 cm$^{-1}$. Further, in $^{13}$C-NMR analysis, aromatic signals were observed at 145.1 ppm and 145.9 ppm. Accordingly, the styrene chain was confirmed to have a syndiotactic configuration.

EXAMPLE 15

The procedure of Example 14 was repeated except that p-methylstyrene and N-phenylmaleimide were used instead of styrene and N-(2-methylphenyl)-maleimide, respectively. The results are shown in Table 6.

TABLE 5

| | Catalyst | | | Monomer | | | |
| | Titanium Compound | | MAO$^{d)}$ | Styrene Monomer | | Comonomer | |
| No. | Type | Amount (mmol) | Amount (mmol) | Type | Amount (mol) | Type | Amount (mol) |
| --- | --- | --- | --- | --- | --- | --- | --- |
| Example 12 | Cp*Ti(OCH$_3$)$_3$$^{a)}$ | 0.03 | 6.0 | Styrene | 0.87 | N-Phenylmaleimide | 0.58 |
| Comparative Example 7 | Cp*Ti(OCH$_3$)$_3$$^{a)}$ | 0.0075 | 1.5 | Styrene | 1.73 | — | — |
| Comparative Example 8 | Ti(OC$_2$H$_5$)$_4$$^{b)}$ | 0.05 | 40 | Styrene | 0.87 | N-Phenylmaleimide | 0.94 |
| Comparative Example 9 | AIBN$^{c)}$ | 1.0 | — | Styrene | 0.87 | N-Phenylmaleimide | 0.05 |
| Example 13 | Cp*Ti(OCH$_3$)$_3$$^{a)}$ | 0.03 | 6.0 | Styrene | 0.87 | N-Phenylmaleimide | 1.16 |

| Copolymer |
| --- |
| Glass |

TABLE 5-continued

| No. | Polymerization Temp. (°C.) | Yield (g) | Intrinsic[e) Viscosity (dl/g) | Content of Comonomer (wt %) | Transition Temp. (°C.) | Melt Temp. (°C.) | Heat Decomposition Temp (°C.) | Heat Deformation Temperature (°C.) | |
|---|---|---|---|---|---|---|---|---|---|
| | | | | | | | | ( 18.5 kg/cm² ) | ( 4.6 kg/cm² ) |
| Example 12 | 40 | 51.5 | 0.66 | 8.0 | 115 | 265 | 360 | 115 | 215 |
| Comparative Example 7 | 70 | 25.4 | 1.68 | — | 97 | 270 | 320 | 100 | 220 |
| Comparative Example 8 | 60 | 0.2 | 0.60 | ~0 | — | — | — | — | — |
| Comparative Example 9 | 60 | 39.5 | 0.87 | 5.0 | 110 | — | 350 | 112 | 113 |
| Example 13 | 30 | 53.7 | 1.41 | 15.0 | 117 | 264 | 365 | 117 | 210 | a) to f) are the same as in Table 1

TABLE 6

| | Catalyst | | | Monomer | | | |
|---|---|---|---|---|---|---|---|
| | Titanium Compound | | MAO[d) | Styrene Monomer | | Comonomer | |
| No. | Type | Amount (mmol) | Amount (mmol) | Type | Amount (mol) | Type | Amount (mol) |
| Example 14 | Cp*Ti(OCH₃)₃[a) | 0.05 | 5 | Styrene | 0.24 | N-(2-Methyl-phenyl)maleimide | 5.9 |
| Example 15 | Cp*Ti(OCH₃)₃[a) | 0.05 | 5 | p-Methyl-styrene | 0.23 | N-Phenyl-maleimide | 50 |

| | | | | Copolymer | | | | |
|---|---|---|---|---|---|---|---|---|
| | Polymerization Temp. (°C.) | Yield (g) | Intrinsic[e) Viscosity (dl/g) | Content of Comonomer (wt %) | Glass Transition Temp. (°C.) | Melt Temp. (°C.) | Heat Decomposition Temp. (°C.) | Heat Deformation Temperature (°C.) | |
| No. | | | | | | | | ( 18.5 kg/cm² ) | ( 4.6 kg/cm² ) |
| Example 14 | 50 | 2.4 | 6.88 | 0.4 | — | 269 | — | — | — |
| Example 15 | 50 | 2.9 | — | — | — | — | — | — | — | a), d) and e) are the same as described in Table 1.

INDUSTRIAL APPLICABILITY

The styrene copolymer of the present invention, particularly, the styrene copolymer A possesses excellent impact resistance and flexibility, while maintaining heat resistance and chemical resistance of syndiotactic polystyrene. The styrene copolymers B and C possess elevated glass transition temperature, heat deformation temperature and heat decomposition temperature and markedly improved compatibility, adhesion and wettability.

Accordingly, the styrene copolymer of the present invention is useful as various structural materials and a compatibilizing agent. Such copolymer can be efficiently produced according to the process of the present invention.

What is claimed is:

1. A styrene copolymer which comprises a styrene repeating unit (a) represented by the formula (I):

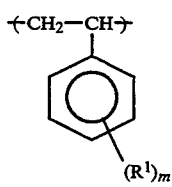

(I)

wherein $R^1$ is a hydrogen atom, a halogen atom or a hydrocarbon group having not more than 20 carbon atoms, m is an integer of 1 to 3, and when m is plural, $R^1$s may be the same or different, and an acrylonitrile repeating unit (b) represented by the formula (II-(b)):

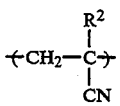

(II-(b))

wherein $R^2$ is a hydrogen atom or a methyl group or a maleimide or N-substituted maleimide repeating unit (d) represented by the formula (II-(d)):

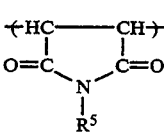

(II-(d))

wherein $R^5$ is a hydrogen atom, a saturated hydrocarbon group having not more than 20 carbon atoms, a saturated hydrocarbon group having at least one hydroxyl group and not more than 20 carbon atoms, a benzyl group, a substituted benzyl group, a phenyl group or a substituted phenyl group, which contains 0.1 to 50 wt. % of said repeating unit (b) or (d), wherein intrinsic viscosity measured in 1,2,4-trichlorobenzene at 135° C. is 0.07 to 20 dl/g and stereoregularity of the styrene repeating unit (a) chain is a high degree of syndiotactic configuration.

2. The styrene copolymer according to claim 1, which comprises the styrene repeating unit (a) represented by the formula (I) and the acrylonitrile repeating unit (b) represented by the formula (II-(b)) and contains 0.1 to 50 wt % of said repeating unit (b).

3. The styrene copolymer according to claim 1, which comprises the styrene repeating unit (a) represented by the formula (I) and the maleimide or N-substituted maleimide repeating unit (d) represented by the formula (II-(d)) and contains 0.1 to 50 wt % of said repeating unit (d).

4. A process for production of the styrene copolymer of claim 1, which comprises copolymerization of a styrene monomer represented by the formula (I'):

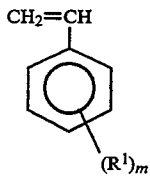  (I')

wherein $R^1$ and m are the same as defined above and an acrylonitrile monomer represented by the formula (II'-(b)):

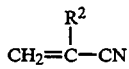  (II'-(b))

wherein $R^2$ is the same as defined above or a maleimide or N-substituted maleimide monomer represented by the formula (II'-(d)):

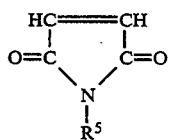  (II'-(d))

wherein $R^5$ is the same as defined above in the presence of a catalyst comprising a titanium compound and alkylaluminoxane.

5. The process for production of the styrene copolymer of claim 2, which comprises copolymerization of the styrene monomer represented by the formula (I') and the acrylonitrile monomer represented by the formula (II'-(b)) in the presence of a catalyst comprising a titanium compound and alkylaluminoxane.

6. The process for production of the styrene copolymer of claim 3, which comprises copolymerization of the styrene monomer represented by the formula (I') and the maleimide or N-substituted maleimide represented by the formula (II'-(d)) in the presence of a catalyst comprising a titanium compound and alkylaluminoxane.

* * * * *